Figure 1:
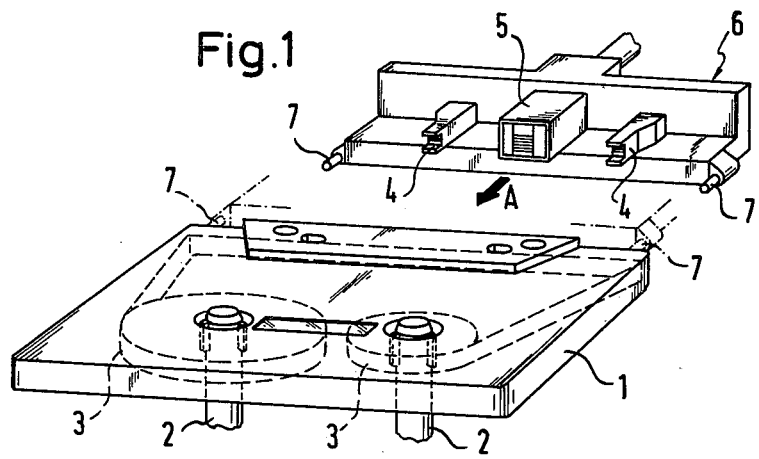

United States Patent [19]
Herleth et al.

[11] 3,949,421
[45] Apr. 6, 1976

[54] CASSETTE TAPE RECORDER WITH HEADS MOUNTED ON A SLIDE FOR ADJUSTMENT

[75] Inventors: Karl Herleth, Munich; Herbert Drexler, Neuesting, both of Germany

[73] Assignee: Uher Werke Munchen GmbH & Co., Munich, Germany

[22] Filed: Apr. 18, 1974

[21] Appl. No.: 462,102

[30] Foreign Application Priority Data
Apr. 18, 1973 Germany.................... 7314874[U]

[52] U.S. Cl..................................... 360/96; 360/109
[51] Int. Cl.$^2$.. G11B 5/48; G11B 5/54; G11B 23/04
[58] Field of Search ............ 360/109, 96, 132, 105, 360/75

[56] References Cited
UNITED STATES PATENTS

| | | | |
|---|---|---|---|
| 3,524,651 | 8/1970 | Ketzer | 360/105 |
| 3,548,113 | 12/1970 | Althuber | 360/105 |
| 3,591,267 | 7/1971 | Kakiuchi et al. | 360/109 |
| 3,595,584 | 7/1971 | Camras | 360/105 |
| 3,751,042 | 8/1973 | Platt | 360/105 |
| 3,759,529 | 9/1973 | Yoshii | 360/105 |
| 3,800,323 | 3/1974 | Jenkins | 360/96 |
| 3,823,945 | 7/1974 | Milligan | 360/105 |

*Primary Examiner*—Alfred H. Eddleman
*Attorney, Agent, or Firm*—Fleit & Jacobson

[57] ABSTRACT

A cassette tape recorder in which the magnetic sound-recording heads and the erasing heads are adjusted to rest on the tape by means of a relative displacement towards the cassette, these heads being fitted on to a common slide unit incorporating sensor elements resting on the tape side of the cassette so that the penetration depth of the heads into the cassette will be adjusted automatically.

12 Claims, 2 Drawing Figures

U.S. Patent   April 6, 1976   3,949,421

CASSETTE TAPE RECORDER WITH HEADS MOUNTED ON A SLIDE FOR ADJUSTMENT

The invention involves a cassette tape recorder in which the magnetic sound-recording heads and the erasing heads are brought into position on the tape by way of relative displacement.

When a cassette tape recorder is used, the cassette inserted or pushed into position is placed on the running reel centre pins, following which the magnetic sound-recording heads and the erasing heads are brought into position on the tape. Along one of its long narrow sides, the cassette has a slit which the heads are able to enter. However, it has been found difficult hitherto to obtain and adjust the correct penetration depth, since such depth is adjusted by a series of intermediate units relative to the running reel centre pins. These pins have a definite position within the tape recorder, certain tolerances however being provided. The same applies to the magnetic sound-recording heads and the erasing heads. Due to these accepted tolerances and their aggregate effect, the depth to which the heads enter the cassette will inevitably be considerably inaccurate. Furthermore, it is not possible for manufacturing reasons to mass-produce tape recorders in such a way that there is always a uniform distance between the running reel centre pins and the magentic sound-recording heads.

In the use of a cassette tape recorder, the depth of penetration plays a particularly important part, above all with a view to the frequency-response curve, running smoothness and dropouts. Whenever the depth of penetration differs, the tape will be subjected to inconsistent pressing forces brought about by the pressure elements and the head surfaces. It follows from this that the tape will be retarded to an unequal extent, so that smooth running characteristics will be impaired. The frequency-response curve depends on the angle at which the tape runs around the heads, the consequence of this being that if the depth of penetration differs, the angle will also differ, thus causing deviations in the frequency-response curve. In addition, if the tape does not run around the head properly, mechanical tape tension will be too low and may therefore result in tape unsteadiness which in turn will cause dropouts.

It is the task of the present invention to allow the magnetic sound-recording heads and the erasing heads to be adjusted to an exact depth of penetration without difficulty.

A further objective of the invention is to provide a cassette tape recorder in which the tolerances permissible in the system as such do not have a detrimental effect on the depth of penetration and above all the adjustment of such depth, so that consequently the depth of penetration becomes entirely independent of the system tolerances.

In addition, the invention is intended to provide a cassette tape recorder in which the depth of penetration of the magnetic sound-recording heads and the erasing heads will be adjusted automatically.

Finally, the invention is to provide for a consistent and exact depth of penetration irrespective of the type of cassette used.

This task is solved by mounting both of the heads on one side incorporating sensors resting on the tape side of the cassette.

In accordance with a preferred design, this slide can be moved relative to the fixed cassette.

The possibility of adjusting the depth of penetration and the reproduceability of such depth in the case of each individual tape recorder can be improved considerably by mounting the slide on which the magnetic sound-recording heads and the erasing heads are fixed in such a way that it can be swivelled along a plane parallel to the top and/or the bottom of the cassette. This means that basically the slide can be moved vertically along the tape side of the cassette while at the same time being swivelled about an axis vertical to this plane.

It is also an advantage to have the slide supported by a spring resting against the tape side of the cassette, while at the same time this spring action presses the cassette against bosses designed particularly as guide pins fitting into recesses in the cassette. The sensors supporting the slide and holding it away from the tape side of the cassette should preferably be located immediately next to the magnetic sound-recording heads so that the gap between these heads and the sensors is very small. In this way, tolerances caused by components which might otherwise lie between the magnetic sound-recording heads and the sensors may be excluded. In addition, when the magnetic sound-recording heads enter the cassette, the sensors should preferably be immediately next to the tape guiding elements in the cassette.

With the present invention, it is preferable to have the guide pins holding the cassette in position and against which the cassette rests thanks to the spring action referred to in the foregoing, fixed in a stationary position immediately opposite to the sensors.

In order to allow the slide to be moved and swivelled, guide pins are provided for which are basically located vertically to the tape side of the cassette. These guide pins are supported by longitudinal slots so that the pins may be swivelled. Within its swivelling axis, each guide pin runs in a round hole of approximately the same diameter as the pin itself. It is also possible to use a longitudinal slot running parallel to the swivelling axis, the width of such slot corresponding to the diameter of the guide pin. The other longitudinal slots run parallel to the plane in which the slide is to be swivelled. The appended Figures show preferred designs of the invention and are to serve as a basis for describing the invention in greater detail.

Figure 2:
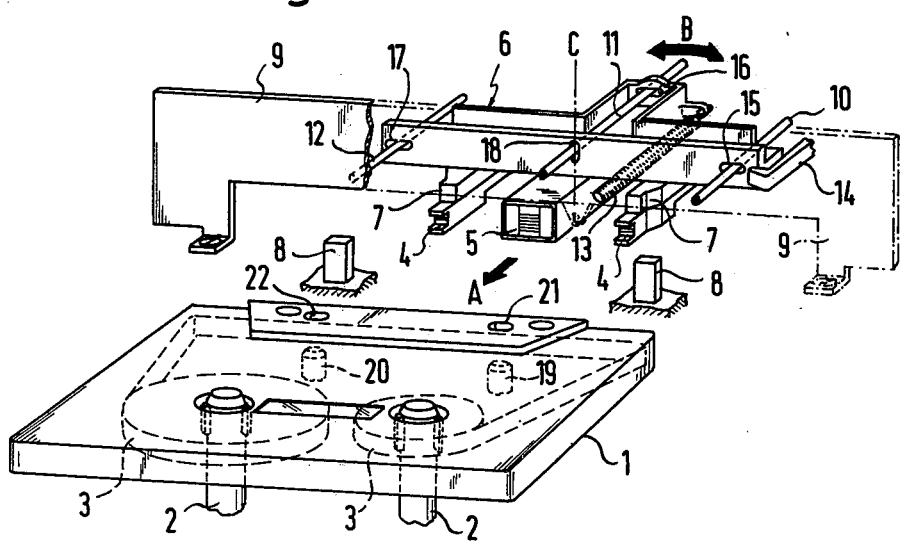

FIG. 1 shows an initial example of the invention with a cassette and the corresponding slide, while FIG. 2 shows a further example of the invention, again with a cassette and the corresponding slide.

In FIGS. 1 and 2, a tape cassette 1 is inserted in the usual manner on to running pins 2 for reel 3. Erasing head 4 and the recording and playback head 5 are mounted on slide 6 which can be moved relative to the cassette or tape cassette 1. In accordance with the innovation provided, slide 6 now incorporates sensors or stop means 7 supported by the narrow side of cassette 1 where the tape slot is located. As soon as sensors 7 reach and are stopped by the cassette, slide 6 is not allowed to move forward any further, this in turn ensuring that erasing heads 4 and magnetic sound-recording head 5 have exactly the right depth of penetration into the tape slots of the cassette down to a tolerance of fractions of a millimeter.

Relative to the heads and above all to erasing heads 4, sensors 7 can either be fixed in position or movable.

Sensors 7 move in the direction indicated by the arrow A, i.e. vertical to the tape surface of cassette 1. In this way, it is possible to compensate differences between the tape guiding elements incorporated in the cassette, so that even when different types of cassettes are used, the depth of penetration will be uniform.

Whereas in the case of FIG. 1 sensors 7 are located at the side of slide 6, they are immediately next to erasing heads 4 in the case of FIG. 2. It has been found suitable to make these sensors out of one unit together with the erasing head supports. In FIG. 2, slide 6 can be swivelled in the direction indicated by arrow B. In this case, the slide is swivelled about an axis C, such axis running through the slide vertical to a plane which is parallel to the top and/or the bottom of tape cassette 1. Along this plane, the slide can be moved in the direction indicated by arrow A towards the tape side of tape cassette 1.

Guide pins 10, 11 and 12 guarantee that slide 6 can be moved as required and swivelled in the direction of double arrow B, such guide pins being fixed in position in the example given on a stationary plate-like unit 9. For example, this unit 9 may then in turn be positively connected with a baseplate of a tape recorder not specified herein. Furthermore, longitudinal slots 15, 16 and 17 are provided for on slide 6 and are basically horizontal in position. Slide 6 also features a vertical longitudinal slot 18 running parallel inside swivelling axis C. The width of longitudinal slots 15–18 is such that the slots correspond to the diameters of guide pins 10, 11, and 12 inserted in them. In the example given and when seen from the front, axis C is approximately in the middle between sensors 7, both of which incorporate bearing surfaces. Nevertheless, this axis may also be at any other point between the sensors, so that it may therefore be located at the side of playback head 5. In order to guarantee a pre-defined swivelling action of slide 6 and thus to provide for self-adjustment of the slide and of erasing heads 4 and playback head 5 relative to the tape, guide slots 15, 16, and 17 are in a horizontal direction while guide slot 18, which is located within the swivelling axis, is in a vertical direction.

When slide 6 is moved in the direction indicated by arrow A and the opposite direction, that slide runs along guide pins 10, 11, and 12. By means of an arrest mechanism such as arrest lever 14, the slide may be held in a retracted position. After arrest lever 14 has been released, the force exerted by a spring 13 will move the slide towards the tape side of tape cassette 1, so that accordingly the playback head and the erasing heads enter the cassette to an adjusted (and above all self-adjusted) depth, this being effected by the bearing surfaces of sensor 7 coming to rest on the bearing surfaces of the tape side of cassette 1. Thanks to the swivelling action provided for in the direction of arrow B, any tolerances resulting from cassette 1 pressing against guide pins 19 and 20 will be compensated. This pressing action of the cassette against guide pins 19 and 20 is effected by the action of spring 13 via slide 6. Accordingly, guide pins 19 and 20 which fit into apertures 21 and 22 of the cassette serve as bosses while aligning the cassette at the same time.

It is also possible to provide for one or several bosses 8. When the cassette is removed, slide 6 is able to move out and rest against boss 8 and arrest lever 14 is released. Bosses 8 are positioned in such a way that when the cassette is inserted the desired depth of penetration is not impaired, i.e. the bearing surfaces of sensors 7 are always able to rest against the corresponding surfaces on the tape side of cassette 1. These bosses may also be provided for on guide pins 10, 11, and 12 or on one of those guide pins. If desired, stationary unit 9 to which guide pins 10, 11, and 12 are attached, may also be positioned in such a manner in the recorder that it acts as a boss.

Slide 6, which incorporates the heads, may also be positioned within the tape recorder itself underneath cassette 1. In that case, guide pins corresponding to guide pins 10–12 may also be used for guiding the slide. If this is to be done, these guide pins can be located on the chassis below the cassette holding device. Here again, the bearing surfaces for sensors 7 are positioned in such a way that the sensors come to rest against the tape side of cassette 1. This provides a more compact arrangement of the guide bed and the cassette.

We claim:

1. A tape recorder of cassette type having means for positioning a cassette in an operative position with the cassette having a tape side for presenting the tape to the heads of the recorder comprising, in combination, a slide having side edges and a front edge with the the recorder heads mounted on said slide front edge, means for supporting said slide on the recorder for sliding movement towards and away from the tape side of a cassette positioned on the recorder in a horizontal plane substantially parallel to the plane of the cassette and for swiveling movement in said horizontal plane about a vertical axis extending intermediate said slide edges, means for yieldingly urging said slide towards said cassette tape side and stop means on said slide front edge engageable with said cassette tape side to position said heads in an accurately aligned, operative position with respect to said cassette.

2. A tape recorder in accordance with claim 1, wherein said urging means comprises a spring, said spring having one end connected to said recorder and the other end to said slide.

3. A tape recorder in accordance with claim 2, including means on the recorder for releasably retaining said slide away from a cassette in said operative position against the urging force of said spring.

4. A recorder in accordance with claim 1, wherein the means for positioning the cassette include a plurality of guide pins on the recorder, a plurality of apertures in the cassette for accommodating said guide pins in said operative position of the cassette and wherein said urging means additionally urge said cassette against said guide pins through said slide.

5. A tape recorder in accordance with claim 4, wherein said stop means are disposed on said slide front edge in aligned relationship with said guide pins.

6. A recorder in accordance with claim 1, wherein said stop means are disposed on said slide front edge adjacent said heads.

7. A tape recorder in accordance with claim 6, wherein said stop means are formed integrally with at least one of said heads.

8. A tape recorder in accordance with claim 1, wherein said means for supporting said slide on the recorder comprise a plurality of horizontally extending, laterally spaced rods supported on said recorder in perpendicular relationship with said cassette tape side, said slide having a plurality of slots for slidably accommodating said rods to permit said sliding and swiveling movement of said slide.

9. A tape recorder in accordance with claim 8, wherein said plurality of slots includes a pair of horizontally extending slots, each adjacent one of said slide side edges and a horizontally extending slot intermediate said pair of slots and wherein said slide is provided with a vertically extending slot defining said slide vertical axis for said swiveling movement and disposed in aligned relationship with said intermediate slot with one of said plurality of rods extending through said intermediate slot and said vertically extending slot.

10. A tape recorder in accordance with claim 1, wherein said vertical axis for said slide swiveling movement is disposed centrally intermediate said stop means.

11. A tape recorder in accordance with claim 1, including at least one boss on the recorder for stopping engagement with said slide to limit the forward movement of said slide by said urging means in the absence of a cassette on the recorder, said boss being disposed on said recorder out of the path of movement of said slide for engagement with a cassette in said operative position.

12. A tape recorder in accordance with claim 1, wherein said stop means are fixedly mounted on said slide in a predetermined position relative to said heads.

* * * * *